(12) United States Patent
Melgar et al.

(10) Patent No.: US 12,236,494 B1
(45) Date of Patent: Feb. 25, 2025

(54) PLATFORM SYSTEM AND METHOD

(71) Applicant: IDS Technology LLC, Arlington, VA (US)

(72) Inventors: Noah Melgar, Arlington, VA (US); John Nicholas Dowling, Arlington, VA (US); Brendan Gregory Hering, Arlington, VA (US); Chris Carlson, Springfield, VA (US); Matthew Ryan Ehlers, Raleigh, NC (US)

(73) Assignee: IDS TECHNOLOGY LLC, Arlington, VA (US)

( * ) Notice: Subject to any disclaimer, the term of this patent is extended or adjusted under 35 U.S.C. 154(b) by 158 days.

(21) Appl. No.: 16/723,076

(22) Filed: Dec. 20, 2019

Related U.S. Application Data

(60) Provisional application No. 62/783,908, filed on Dec. 21, 2018.

(51) Int. Cl.
| | | |
|---|---|---|
| *G09B 23/28* | (2006.01) | |
| *G06F 21/57* | (2013.01) | |
| *G06Q 50/00* | (2012.01) | |
| *G09B 9/00* | (2006.01) | |
| *H04L 9/40* | (2022.01) | |
| *H04L 51/52* | (2022.01) | |

(52) U.S. Cl.
CPC .......... *G06Q 50/01* (2013.01); *G06F 21/577* (2013.01); *G09B 9/00* (2013.01); *H04L 63/1433* (2013.01); *H04L 51/52* (2022.05)

(58) Field of Classification Search
None
See application file for complete search history.

(56) References Cited

U.S. PATENT DOCUMENTS

| | | | |
|---|---|---|---|
| 10,068,493 B2* | 9/2018 | Brueckner | G09B 9/00 |
| 10,812,497 B2* | 10/2020 | Venkatramani | H04L 63/0272 |
| 11,189,188 B2* | 11/2021 | Morton | G09B 19/0053 |
| 2010/0218253 A1* | 8/2010 | Sutton | G06F 21/554 726/23 |
| 2015/0024353 A1* | 1/2015 | Chesnutt | G09B 19/00 434/219 |
| 2015/0051872 A1* | 2/2015 | Arora | G06F 11/3428 702/186 |
| 2015/0052074 A1* | 2/2015 | Reynolds | G06Q 10/107 705/325 |
| 2017/0309198 A1* | 10/2017 | Johnson | G06Q 50/01 |
| 2018/0024353 A1* | 1/2018 | Tanaka | G02B 26/105 257/113 |

* cited by examiner

*Primary Examiner* — Natisha D Cox
(74) *Attorney, Agent, or Firm* — Brian J. Colandreo; Heath M. Sargeant; Holland & Knight LLP

(57) ABSTRACT

A method, computer program product, and computer system for receiving, by a computing device, a design scenario for execution on one or more internet based platforms. Seed data may be injected into the one or more internet based platforms during execution based upon, at least in part, the design scenario. Performance of the scenario may be monitored. A report may be generated based upon, at least in part, the performance.

21 Claims, 10 Drawing Sheets

PLATFORM SYSTEM AND METHOD

RELATED APPLICATION

This application claims the benefit of U.S. Provisional Application No. 62/783,908 filed on 21 Dec. 2018, the contents of which are all incorporated by reference.

BACKGROUND

Historically, training exercise information environments (IE) (e.g., military, commercial, federal, state, and local government, etc.) command and control (C2), and orchestration have been managed between disparate, often geographically separated, and siloed role-based exercise controllers and observer coach/trainers (OC/T). C2 was reliant upon manual deployment and input by exercise controllers and OC/Ts, which, given the scale and scope of the exercise IE, was manpower intense and proved unrealistic resulting in degraded training value. Moreover, the exercise IE is generally flat, static, does not adequately simulate human behavior, and was unable to inter-operate with third-party technologies vital to tactics (e.g., military tactics), techniques, and procedures (TTPs) being designed purely as an intelligence feed without regard for other specialties, processes, or functional areas. This has led to unrealistic and low fidelity training value.

BRIEF SUMMARY OF DISCLOSURE

In one example implementation, a method, performed by one or more computing devices, may include but is not limited to receiving, by a computing device, a design scenario for execution on one or more internet based platforms. Seed data may be injected into the one or more internet based platforms during execution based upon, at least in part, the design scenario. Performance of the scenario may be monitored. A report may be generated based upon, at least in part, the performance.

One or more of the following example features may be included. The seed data may be injected at a predetermined data and time. The design scenario may be selected from a user interface. The performance may be monitored for one of a trainee and software. The one or more internet based platforms may include at least one of a social media platform, an internet relay chat, email, a blog, a deep web website, and a dark web website. The design scenario may be executed with internet access. The design scenario may be executed without internet access.

In another example implementation, a computing system may include one or more processors and one or more memories configured to perform operations that may include but are not limited to receiving a design scenario for execution on one or more internet based platforms. Seed data may be injected into the one or more internet based platforms during execution based upon, at least in part, the design scenario. Performance of the scenario may be monitored. A report may be generated based upon, at least in part, the performance.

One or more of the following example features may be included. The seed data may be injected at a predetermined data and time. The design scenario may be selected from a user interface. The performance may be monitored for one of a trainee and software. The one or more internet based platforms may include at least one of a social media platform, an internet relay chat, email, a blog, a deep web website, and a dark web website. The design scenario may be executed with internet access. The design scenario may be executed without internet access.

In another example implementation, a computer program product may reside on a computer readable storage medium having a plurality of instructions stored thereon which, when executed across one or more processors, may cause at least a portion of the one or more processors to perform operations that may include but are not limited to receiving a design scenario for execution on one or more internet based platforms. Seed data may be injected into the one or more internet based platforms during execution based upon, at least in part, the design scenario. Performance of the scenario may be monitored. A report may be generated based upon, at least in part, the performance.

One or more of the following example features may be included. The seed data may be injected at a predetermined data and time. The design scenario may be selected from a user interface. The performance may be monitored for one of a trainee and software. The one or more internet based platforms may include at least one of a social media platform, an internet relay chat, email, a blog, a deep web website, and a dark web website. The design scenario may be executed with internet access. The design scenario may be executed without internet access.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

Figure 1:
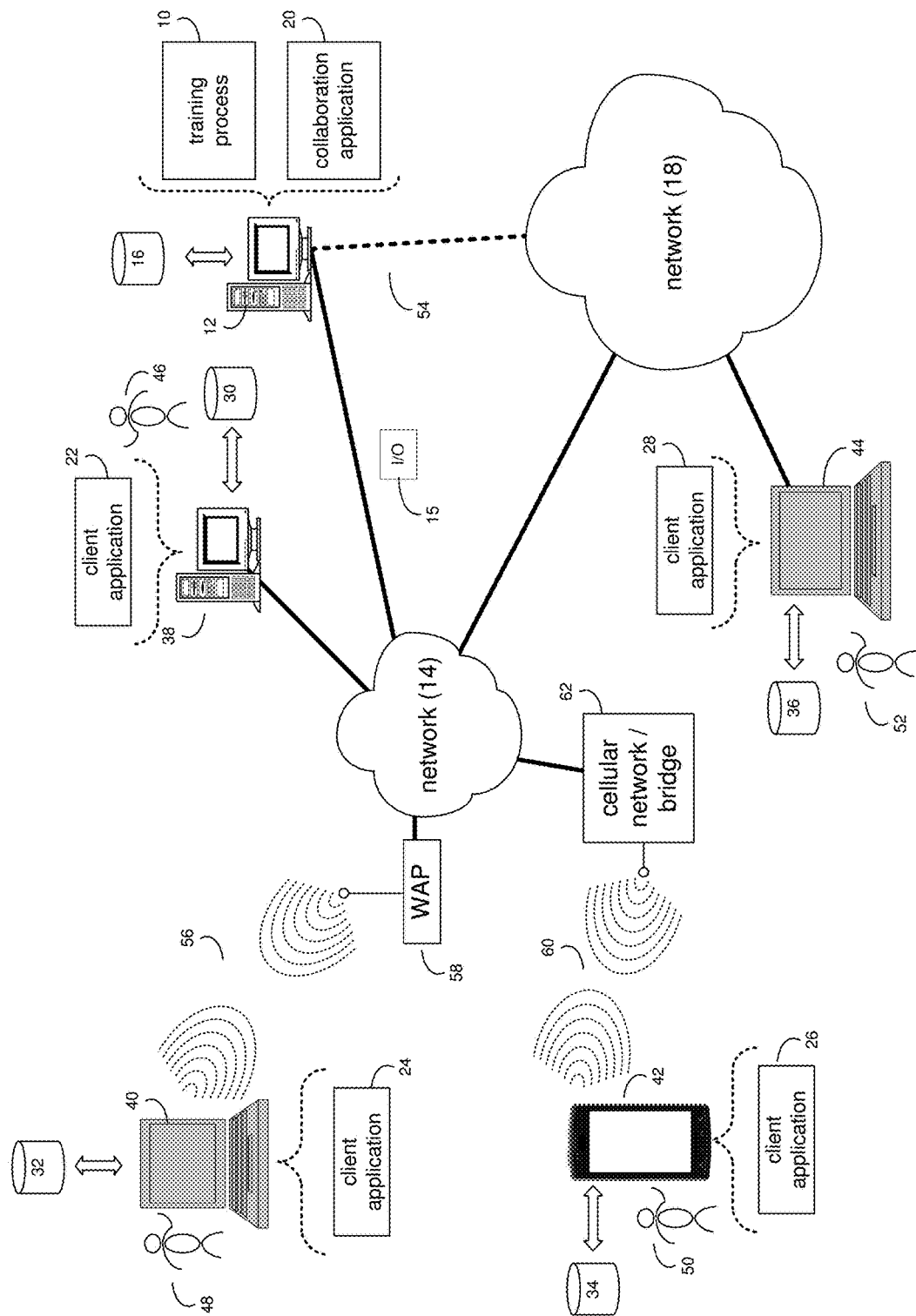
FIG. 1 is an example diagrammatic view of a training process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a body area network BAN), a personal area network (PAN), a metropolitan area network (MAN), etc., or the connection may be made to an external computer (for example, through the internet using an Internet Service Provider). In some implementations, electronic circuitry including, for example, programmable logic circuitry, an application specific integrated circuit (ASIC), field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function (s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown training process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). A SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a training process, such as training process 10 of FIG. 1, may receive, by a computing device, a design scenario for execution on one or more internet based platforms. Seed data may be injected into the one or more internet based platforms during execution based upon, at least in part, the design scenario. Performance of the scenario may be monitored. A report may be generated based upon, at least in part, the performance.

In some implementations, the instruction sets and subroutines of training process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store 20, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, training process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a collaboration application (e.g., collaboration application 20), examples of which may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, social media application, streaming video application, or other application that allows for virtual meeting and/or remote collaboration. In some implementations, training process 10 and/or collaboration application 20 may be accessed via one or more of client applications 22, 24, 26, 28. In some implementations, training process 10 may be a standalone application, or may be an applet/application/script/extension that may interact with and/or be executed within collaboration application 20, a component of collaboration application 20, and/or one or more of client applications 22, 24, 26, 28. In some implementations, collaboration application 20 may be a standalone application, or may be an applet/application/script/extension that may interact with and/or be executed within training process 10, a component of training process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of training process 10 and/or collaboration application 20. Examples of client applications 22, 24, 26, 28 may include, but are not limited to, e.g., a web conferencing application, a video conferencing application, a voice-over-IP application, a video-over-IP application, an Instant Messaging (IM)/"chat" application, a short messaging service (SMS)/multimedia messaging service (MMS) application, social media application, streaming video application, or other application that allows for virtual meeting and/or remote collaboration, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., audio/video, photo, etc.) capturing and/or output device, an audio input and/or recording device (e.g., a handheld microphone, a lapel microphone, an embedded microphone (such as those embedded within eyeglasses, smart phones, tablet computers and/or watches, etc.), and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of training process 10 (and vice versa). Accordingly, in some implementations, training process 10 may be a purely server-side application, a purely client-side application, or a hybrid server-side/client-side application that is cooperatively executed by one or more of client applications 22, 24, 26, 28 and/or training process 10.

In some implementations, one or more of client applications 22, 24, 26, 28 may be configured to effectuate some or all of the functionality of collaboration application 20 (and vice versa). Accordingly, in some implementations, collaboration application 20 may be a purely server-side application, a purely client-side application, or a hybrid server-side/client-side application that is cooperatively executed by one or more of client applications 22, 24, 26, 28 and/or collaboration application 20. As one or more of client applications 22, 24, 26, 28, training process 10, and collaboration application 20, taken singly or in any combination, may effectuate some or all of the same functionality, any description of effectuating such functionality via one or more of client applications 22, 24, 26, 28, training process 10, collaboration application 20, or combination thereof, and any described interaction(s) between one or more of client applications 22, 24, 26, 28, training process 10, collaboration application 20, or combination thereof to effectuate such functionality, should be taken as an example only and not to limit the scope of the disclosure.

In some implementations, one or more of users 46, 48, 50, 52 may access computer 12 and training process 10 (e.g., using one or more of client electronic devices 38, 40, 42, 44) directly through network 14 or through secondary network 18. Further, computer 12 may be connected to network 14 through secondary network 18, as illustrated with phantom link line 54. Training process 10 may include one or more user interfaces, such as browsers and textual or graphical user interfaces, through which users 46, 48, 50, 52 may access training process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12 (and vice versa). Examples of I/O request 15 may include but are not limited to, data write requests (e.g., a request that content be written to computer 12) and data read requests (e.g., a request that content be read from computer 12).

Figure 2:
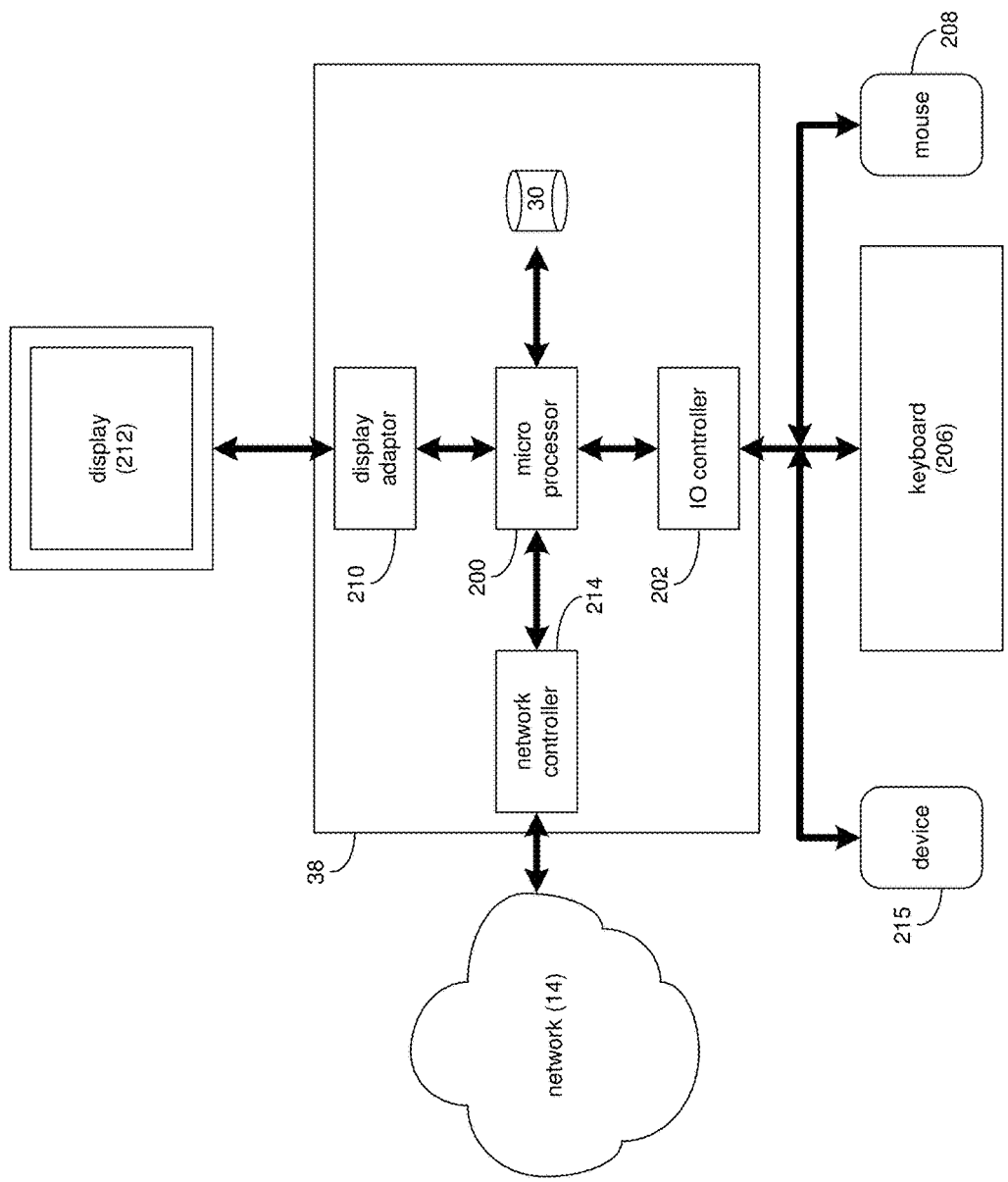
FIG. 2 is an example diagrammatic view of a computer of FIG. 1 according to one or more example implementations of the disclosure.
Figure 3:
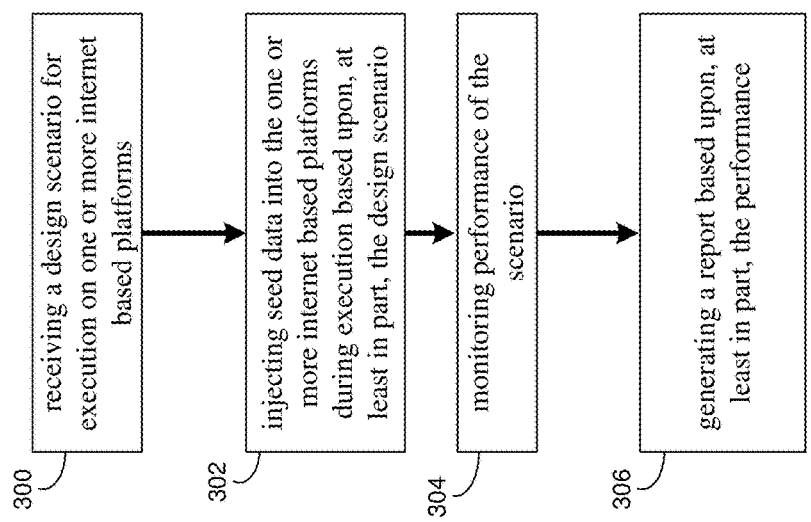
FIG. 3 is an example flowchart of a training process according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, training process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor (e.g., microprocessor 200) configured to, e.g., process data and execute the above-noted code/instruction sets and subroutines. Microprocessor 200 may be coupled via a storage adaptor to the above-noted storage device(s) (e.g., storage device 30). An I/O controller (e.g., I/O controller 202) may be configured to couple microprocessor 200 with various devices (e.g., via wired or wireless connection), such as keyboard 206, pointing/selecting device (e.g., touchpad, touchscreen, mouse 208, etc.), custom device (e.g., device 215), USB ports, and printer ports. A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

Some training platforms may replicate social media aspects of the internet (e.g., Decisive Action Training Environment (DATE) compliant) and adjusted for specific exercise needs, support cyber training, exercises, and mission qualification of the cyber mission forces, to prepare cyber operators, mission forces, and cyber students to detect and defend against malicious events and conduct hunt and counter cyber operations, as well as be better prepared to navigate the online information environment, make better decisions, save more lives, and defend brands and bottom lines. Generally, this may provide the replicated feeds and information of government websites, international news agencies, Twitter, Facebook, YouTube, etc. It may provide units access to dedicated ION partitions, for which the unit themselves extend controlled access to users for updating, modifying, and posting new information relative to their scenario; however, such a platform does not dynamically inject content via APIs, enable end users to plan, design, or development complex exercise scenarios, events, themes, or narratives, utilize robust content repositories to store content for reuse, control individual or groups of personas based on geopolitical, demographic, or socioeconomic variables, control and manipulate narrative sentiment, configure metadata, deploy internet based and enabling platforms on demand, or manage and manipulate information to the IE.

Therefore, as will be discussed in more detail below, the present disclosure may enable an improved computer based training platform that allows for the dynamic injection of content using multiple APIs, containerization, content repositories, digital persona management at scale, and metadata.

The Training Process:

As discussed above and referring also at least to the example implementations of FIGS. 3-9, training process (TP) 10 may receive 300, by a computing device, a design scenario for execution on one or more internet based platforms. TP 10 may inject 302 seed data into the one or more internet based platforms during execution based upon, at least in part, the design scenario. TP 10 may monitor 304 performance of the scenario. TP 10 may generate 306 a report based upon, at least in part, the performance.

In some implementations, TP 10 may receive 300, by a computing device, a design scenario for execution on one or more internet based platforms. For example, a design scenario may be created to, e.g.,: assess human intelligence (e.g., signals, all-source, open source, human, etc.) analysts, assess human offensive cyber operators, assess human defensive cyber operators, assess human irregular and/or unconventional warfare operators, assess human public affairs analysts, assess human psychological operators, assess human civil affairs specialists, test virtualized network infrastructure to ensure it behaviors like its real world counterpart (e.g., digital twin), assess virtualized infrastructure vulnerabilities, assess operating systems (e.g., Linux, Windows, etc.) vulnerabilities, test intrusion detection system/intrusion prevention system software to determine if it can detect cyber-attacks in the scenario, test endpoint detection agent software to determine if it can detect and illicit a response in the scenario, test penetration testing software to determine if it can achieve offensive cyber effects in the scenario, test newly developed offensive cyber tools (e.g., viruses, worms, malware, etc.), test honey pots, as well as any other scenario.

In some implementations, the one or more internet based platforms may include at least one of a social media platform, an internet relay chat, email, a blog, a deep web website, and a dark web website. However, it will be appreciated that any other internet based platforms may be used without departing from the scope of the disclosure.

In some implementations, the design scenario may be selected from a user interface. For instance, the scenario may be received by being selected by a user (e.g., via UI 400 shown in the example implementation of FIG. 4). For example, an exercise planner may use UI 400 to assist with exercise scenario design and development. The completed Master Event Scenario List (MESL) may be imported or if not complete, constructed in UI 400 during the planning process to synchronize training events in the training exercise environment (IE). In some implementations, network topology may be virtually deployed (or with hardware-in-the-loop) to support the IE. The above-noted example internet based platforms may be deployed by TP 10 on that virtual infrastructure based on the planned events in the IE.

Figure 4:
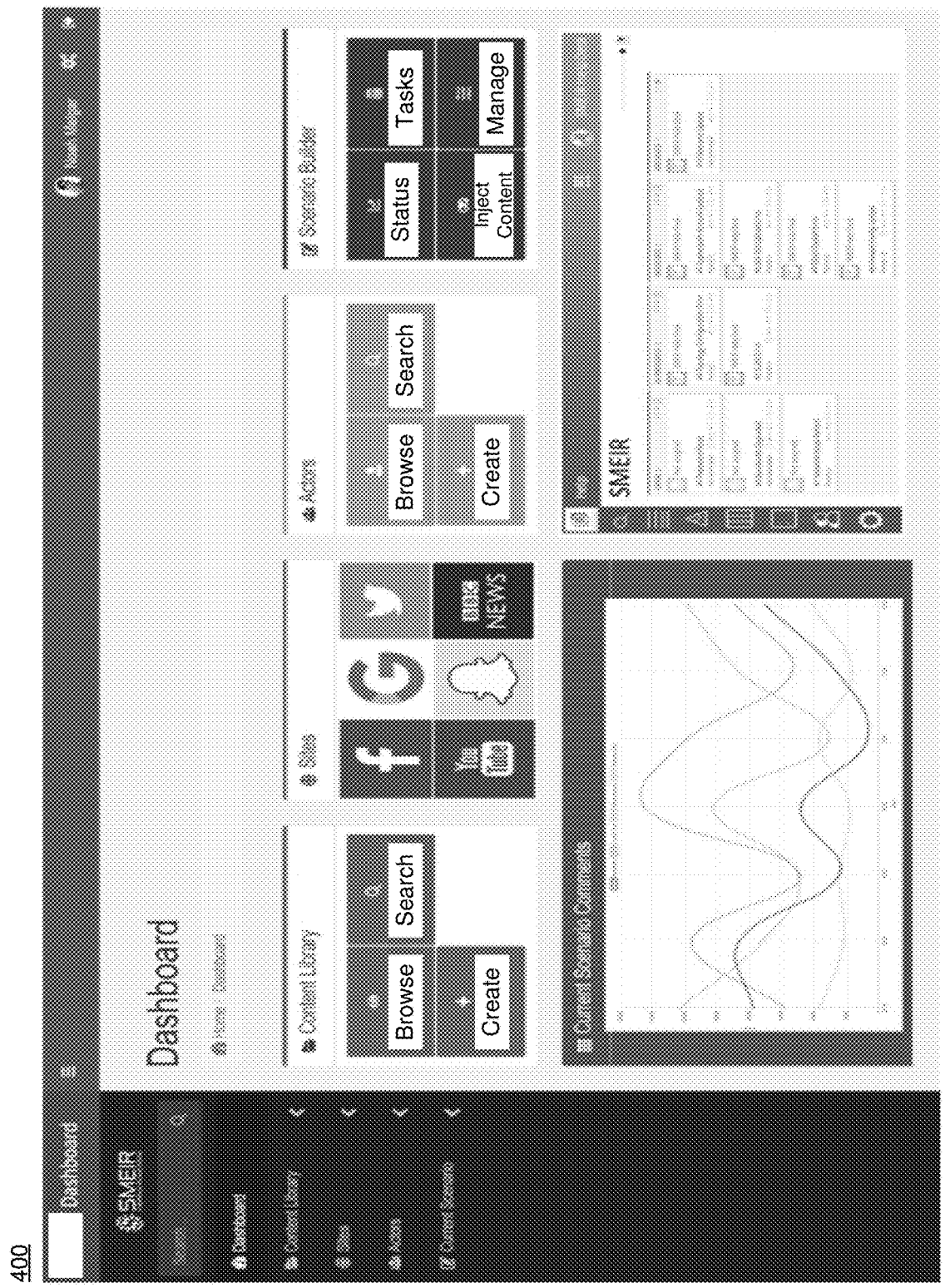
FIG. 4 is an example diagrammatic view of a user interface of a training process according to one or more example implementations of the disclosure.
Figure 5:
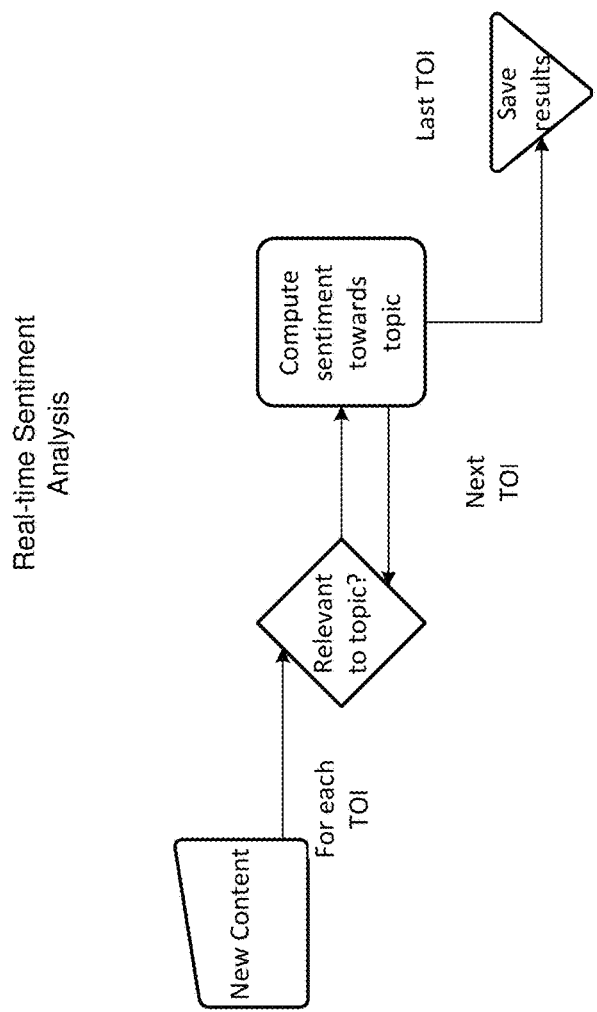
FIG. 5 is an example flowchart of a training process according to one or more example implementations of the disclosure.

As shown in FIG. 4, all elements of the UI layout may be user configurable. The layout may be separated by concerns. Storage repositories (e.g., persona, content, file, etc.), command and control of specific replicated internet based and enabling platforms, scenario planning, design, and development, analytics, and trouble ticketing and help desk are such examples. A side menu may display the same navigational choices, but in a list or drop-down manner for example.

The storage repositories may generally be described as the graphical representation of each respective database. The "Actor Library" is the storage repository for all personas and their associated metadata. Similarly, the "Content Library" is a storage repository for all exercise content (e.g., posts, tweets, news articles, blog posts, etc.) and the "File Library" houses all images, video, and other media files. It will be appreciated that various combinations of repositories, including a single repository, may be used as well.

"Sites" enables user command and control access for specific replicated internet based platforms (e.g., Facebook, Twitter, YouTube, Snapchat, online news media, etc.). From this page, users may be able to control and monitor specific internet based platform functionality and associated trainee interaction or engagement.

"Scenario Builder" enables exercise scenario planning, design, and development. System performance and user analytics are user configurable and can be displayed on the dashboard. UI 400 is designed for maximum interoperability. The trouble ticketing and help desk panel depicted, is one such example. Users may choose to connect different third-party solutions depending on their use case or exercise applicability.

All scenario related data (e.g., content, personas, events, etc.) may be archived in respective repositories (or the same repository) for reuse at a later event. Exercise design and development may take considerable manpower and investment. Since training exercises often use similar geopolitical, demographic, or socioeconomic variables, these may be reused to save valuable time and resources.

In some implementations, the design scenario may be executed with internet access, and in some implementations, the design scenario may be executed without internet access. For example, TP 10 may be executed with an on-premise stand-alone appliance with internet access, a proxy server or direct link to the internet, on-premise stand-alone appliance without internet access, completely closed-loop utilizing layer two extensions and UTP cables, cloud with internet access, cloud without internet access, hybrid cloud with internet access, mix of on-premises and cloud infrastructure, hybrid cloud without internet access, mix of on-premises and cloud infrastructure, etc.

The benefit of internet access is all users have the ability to download media or other exercise applicable data (e.g., Linux distributions, JavaScript libraries or modules, exploits, etc.) as necessary to augment the scenario narrative. The benefit to execute without internet access is data security. It is not possible, insider threat aside, for a breach in a closed loop environment. In either case, support services necessary for the operation of UI 400 (e.g., Docker image repositories, operating system package repositories, time servers, etc.) may be provided. Internet-connected deployments may use internet-accessible services for these needs while air-gapped (not internet connected) deployments may provide these services locally.

In some implementations, TP 10 may inject 302 seed data into the one or more internet based platforms during execution based upon, at least in part, the design scenario, and in some implementations, the seed data may be injected at a predetermined data and time. For instance, baseline seed data may be injected to each respective internet based platform for realism. Seed data may generally refer to the initial data provided with the system so the IE appears to be active, engaged, and therefore realistic to trainees upon exercise execution. Without this data, the IE would be devoid of content which is unrealistic. Generally, seed data may be considered a one-time initial dump of data prior to the exercise execution so it feels like a living and breathing IE. Anything after the start of the exercise is part of the scripted narrative, in response to trainee action/inaction, or as needed to support the scenario event. Each event from the MESL may be scheduled to inject at its planned date-time group (DTG) based upon the design scenario. An exercise event may generally be described as a message or something that happens as the scenario unfolds to specifically test an training objective. Events may be scheduled by TP 10 (e.g., via DTG) through the scenario planning, design, and development process and via content injection. Events may be tied to personas and content (either imported or created via UI 400). As such, an event in the IE may be associated with content (e.g., cyber-attack, tweet, news article, blog post, etc.) and the persona(s) (e.g., John Smith of BBC News, a state sponsored hacker group, etc.) that carried out the action. Sentiment boundaries and influencing methodologies may be set for the overarching exercise narrative, as well as for each event narrative. The Sentiment Model (e.g., which may be included in TP 10) may classify content in a range from, e.g., zero to five where: zero is neutral, 1 being strongly negative to five being strongly positive. A narrative may have a set topical or thematic boundary which ensures content generated by TP 10 remains within those boundaries.

In some implementations, TP 10 (e.g., via UI 400) may employ innovative Artificial Intelligence (AI)/Machine Learning (ML) engine(s) methodologies to dynamically create exercise relevant content that progresses seamlessly from the previous narrative context or to correct sentiment shift. OC/T may define topics of interest (TOI) for which TP 10 may track sentiment by monitoring newly added content in real-time, computing the sentiment of that content for or against TOI, and storing the result of that computation in an internal database. An example flowchart of this real-time sentiment analysis is shown in the example implementation of FIG. 5. When new TOI are configured during an ongoing exercise, preexisting data may be analyzed in the same way. TP 10 may periodically compute the average current sentiment towards configured topics. TP 10 (e.g., via OC/T) may also configure permissible boundaries for the sentiment or sentiment trend of configured TOI as well as remedial actions to be taken when configured boundaries are exceeded, such as the automatic injection of content into the IE relevant to the TOI with a more favorable sentiment (e.g., injecting content with a positive sentiment when average sentiment becomes too negative) to drive sentiment back towards the desired range or trend. When the current sentiment exceeds configured boundaries, TP 10 may automatically inject content to drive sentiment back towards the desired range.

In some implementations, TP 10 may monitor 304 performance of the scenario, and in some implementations, the performance may be monitored for one of a trainee and software. For example, exercise controllers and OC/Ts (e.g., via TP 10) may monitor the IE to ensure human trainees follow their prescribed disciplines (e.g., intelligence functions, defensive cyber operations, emergency management response, etc.) TTPs during training events in the scenario. As another example, the performance may be monitored for software to determine whether it accurately tested virtualized network infrastructure to ensure it behaviors like its real world counterpart (e.g., digital twin), assess virtualized infrastructure vulnerabilities, assess operating systems (e.g., Linux, Windows, etc.) vulnerabilities, test intrusion detection system/intrusion prevention system software to determine if it can detect cyber-attacks in the scenario, test endpoint detection agent software to determine if it can detect and illicit a response in the scenario, test penetration testing software to determine if it can achieve offensive cyber effects in the scenario, test newly developed offensive cyber tools (e.g., viruses, worms, malware, etc.), test honey pots, as well as any other performance monitoring.

The user activity sink (UAS) is a standalone microservice (which may be part of TP 10) responsible for recording user-generated actors and content into the UI 400 Actor and Content libraries by subscribing to user activity events on the event bus. The event bus is a background messaging system used internally to broadcast user activity and system events across the entire system, for storage and later consumption, and/or real time analysis. For example, when a user writes a new post, that event will propagate out of the respective internet based or enabled platform via the event bus and is available to any interested consumers. This is true for other user and system events (e.g., reading a user's post, sending a message, application startup and shutdown, configuration changes, liking a comment, etc.).

Example metrics monitored may include: number of user logins and the duration of said logins, corresponding IP addresses of the logins, user session frequency, duration, and level of activity, option to drill down to see all user activity for each session, number of users actively using SITE at any given time, ratio of content origin, injected vs user-generated, average sentiment over time towards a given topic. These reports may be filtered to include data that pertains to any combination of, e.g.,: a specific application or group of applications, a specific time period, a specific user or group of users, a specific actor or demographic.

In some implementations, TP 10 may generate 306 a report based upon, at least in part, the performance. For example, once the exercise is complete, exercise controllers and OC/Ts may review robust analytics of trainee/software activity to distill what occurred, why it happened, and how it can be done better by the participants and those responsible for the event. Detailed reports may be generated based on a variety of recorded metrics (e.g., user activity, user generated content, associated sentiment shifts, etc.).

In some implementations, TP 10 may include a service and message broker that facilitates communication between a wide variety of separate applications and their inputs into standardized outputs that may be manipulated by TP 10. Example inputs may include, e.g.,: application specific data models, or method(s) for accessing the application programmatically (e.g., direct database access, API, shared library, etc.). Example outputs may include, e.g.,: common data models, and method stubs (e.g., ActorStub, ActorAccountStub, ContentItemStub, AttachmentStub, TargetStub). A method stub or simply stub, may generally be described as a piece of code used to stand in for some other programming functionality (e.g., type identifier, record unique identifier, variable fields, abstracts, etc.). A stub (e.g., via TP 10) may simulate the behavior of existing code (e.g., a procedure on a remote machine), or be a temporary substitute for yet-to-be-developed code.

Example inputs may include, e.g., application-specific data models, some method for accessing the application programmatically (e.g., direct database access, API, shared library, etc.). Example outputs may include, e.g., common data models, stubs (simple model to reference another entity, may contain type identifier, record unique identifier, and "display name" fields, abstract, specific types are available, e.g.,: ActorStub, ActorAccountStub, ContentItemStub, AttachmentStub, TargetStub (for related content).

In some implementations, standardized data models for each application may be used. For example, references to other actors or content may be represented as standard complex data structures containing unique identifiers, display names, and other information, type inheritance is used where applicable (e.g., "tweeter actor account" inherits from "actor account", etc. TP 10 may include a content manager for each content type, e.g., actors are a specialized content type, managers support a basic set of operations, may be extended to support additional operations.

In some implementations, TP 10 may use metadata, such as schema for data types exposed by broker, may include rich metadata to allow consumers to understand what they are seeing through introspection, description of supported applications, including their content types, the actions available for each content type, links to schemas with field-level metadata for each data type. In some implementations, the data libraries may include a collection of personas, content, files, etc, where each entry may include rich metadata. A digital library may include exercise scenario linkage, and content injection may include scheduling, a web based GUI (e.g., UI 400), microservices containers/pods, API Gateway control services, etc.

In some implementations, TP 10 may include an on-demand platform deployment and content seeding. For instance, TP 10 may include a platform library, ability to upload platforms to/export platforms from library, etc. Platforms may include, e.g., a container or VM image(s), deployment specification (some kind of infrastructure as code definition), deploy platforms from UI 400, seed deployed platform with specified data relevant to scenario/exercise, or whatever the user requests, etc. A scenario library may also be included (e.g., via UI 400), with the ability to import, CRUD scenarios to/export from library, import existing MSEL templates, etc. The above-noted scenarios may include, e.g., events, themes, personas, content, narrative, messaging, etc.

As noted above, TP 10 (e.g., via UI 400) may be used to C2, orchestrate manage and manipulate information through a persistent and realistic IE in which multiple disciplines (e.g., military or commercial) may train to leverage publicly available information (PAI) in support of their individual and the collective missions. UI 400 may enable complex scenario planning, design, development, storage, and reuse of relevant content, and deployment at scale. TP 10 (e.g., via UI 400) may interface with replicated internet based content and enabling platforms to manage and manipulate replicated content in real-time (e.g., posting, deleting posts, liking content, unliking content, commenting, deleting comments, etc.). These platforms include but are not limited to, e.g.,: major social media platforms (e.g., Twitter, Facebook, YouTube, Instagram, Snapchat, VK, Sina Weibo, QQ, WeChat, etc.), blogs, email, peer-to-peer messaging (e.g.,: Internet Relay Chat, XMPP), deep web applications (those not indexed by search engines), dark web applications (e.g., illicit websites on the Tor network), online news media, government and NGO websites, crowdfunding websites, auction websites, massively multiplayer online video games, domain name system (DNS), virtualized internet backbone infrastructure, etc.

Dynamic content injection is the process of adding media (e.g., social media posts, accompanying images and video, blog posts, online news media articles, emails, instant messages, etc.) to the current scenario narrative en masse, on demand or scheduled for the future. A repository database which stores all exercise content (e.g., social media posts, blog posts, online news media articles, instant messages, emails, etc.) until they are needed or for reuse in the future (e.g., a future exercise). TP 10 may inject this content to their respective internet based platform, in some cases via calls between TP 10's API and the platform API and in others directly (not all platforms necessarily have APIs).

Application containerization may generally be described as an OS-level virtualization method used to deploy and run distributed applications without launching an entire VM for each app. Managing one digital persona in the IE can be manpower intense depending on how influential or prolific that persona is in the exercise narrative. The real world IE has millions of personas which further complicates the replicated IE. To that end, TP 10 may enable exercise controllers and OC/Ts to C2 an infinite number of digital personas through content injection and traffic generation. Digital persona (e.g., geopolitical, demographic, and socio-economic information) and internet based and enabling platform metadata (e.g., description of the website, keywords, metatags, size and formatting or other characteristics of a data item, etc.) may be fully customizable and configurable, where appropriate.

TP 10 (e.g., via UI 400) may be designed to be software and media agnostic by leveraging industry standard, cutting edge, and bleeding edge technologies (e.g., container orchestration). It is designed to work closely with broader live, virtual, and constructive training to ensure digital training is fully integrated and synchronized with broader training and exercise objectives. An example scenario is discussed below:

Start Exercise (STARTEX): begins on 140900ZDEC19
End Exercise (ENDEX): ends on 310900ZDEC19
All major players within and bordering the Caucasus region maintain multiple significant strategic interests in conflict with those of their neighbors. Divided by religious and ethnic hatreds hundreds of years old, the Caucasus represents one of the major spots of "frozen conflict" in the world-a critical one that sits astride a major global source for oil and natural gas. The Caucasus countries of Ariana, Atropia, Donovia, Gorgas, and Limaria find themselves interconnected by ties of conflict unlikely to abate in the near future.
In the Caspian Sea, Ariana and Atropia maintain claims to offshore oil and gas fields that conflict with each other. Atropia also has a chilly relationship with Limaria over Lower Janga. Atropia attempts to sustain cordial relations with Donovia, though the country finds itself dependent on Gorgan pipelines to export oil and gas. Limaria generally remains isolated from its Atropian neighbor, but remains integrated with Donovia and pursues deeper ties with Ariana. Donovia and Ariana attempt to assert their traditional power in the region, while the other independent states seek to preserve their own political identities and economic viability.

Example Scenario Themes:

Atropian blockade of goods and electricity to Limaria: Limaria remains dependent on Gorgas (despite a limited embargo) and Ariana—an international pariah—for access to much of its imports and power.
Lower Janga (current ceasefire): Localized violence routinely disrupts the ceasefire agreement.
South Ostremek (current ceasefire): The ceasefire simply stabilized the conflict lines, as the Donovians want to politically pry Gorgas away from EU or NATO membership, or even close cooperation with the Western world. Gorgas definitely seeks a return to its pre-war territorial boundaries.
Zabzimek (current ceasefire): Like South Ostremek, Gorgas prefers a return to the pre-war status quo and boundaries, while Donovia wants to further isolate Gorgas from its Atropian and Western allies.
Archeological sites and religious shrines in Ariana: Ariana controls significant Shia religious sites where many Muslims conduct pilgrimages for religious purposes.
Transnational pipeline operations: The export of crude oil and natural gas to the world remains a significant challenge for Ariana and Atropia. Oil producers possess several pipeline projects that diversify their export options, but pipelines remain vulnerable to interdiction.
Caspian Sea oil and natural gas reserves: The demarcation of Caspian Sea deposits remains a source of contention. Oil and gas fields are the lifeblood of the countries that possess them, and their exact demarcation leads to contentious arguments over the boundaries.
Arianian nuclear program: The Arianian government's desire to maintain a robust weapons of mass destruction (WMD) program causes strife with nearly all its neighbors, as the relative power of a WMD-armed Ariana complicates the delicate balance of power that currently exists in the region.
The Caucasus remains an area with dynamic and continuous conflict. Any conflict, especially one that threatens oil and gas production or export, will likely involve outside powers, including the US. The Caucasus also is in a relatively inaccessible spot for US forces due to the geographic realities of airspace and sea lines of communications.

Scenario Events and associated content injects:

Insurgents Demand UN Dismissal
Aid workers are abducted in a refugee camp near the capital.
Kidnappers issue a message to the government to release its members in prison in exchange for the workers' safe return.
Kidnappers post a video on Youtube issuing their demands at 141551ZDEC19.
Online news media report on the incident by posting to their respective outlets websites 141611Z DEC 19.
Insurgents start attacking refugee camp, creating fear among refugees and residents in nearby towns.
Refugees post images, video, and text regarding the attacks beginning at 151000ZDEC19 and ending on 182200ZDEC19.
Insurgents post images, video, and text of the attacks on 151030ZDEC19.
A convoy carrying aid workers back to the capital is ambushed and all workers are killed.
US and its allies are forced to provide assistance with security for aid workers.
US forces public affairs office (PAO) posts a statement they are now protecting aid workers to official social media channels, online news media, internet radio, etc.
The population wants the government to drive insurgents out of their villages so they can continue to receive aid.
Population posts to social media (i.e. images, video, and text) calls for government protection beginning on 151000ZDEC19 and ending on 241000ZDEC19.
Numerous aid agencies leave the country.
Internally displaced persons (IDPs) and refugees will suffer greatly because they depended on the agencies' aid for survival.
Aid agencies post to official social media channels they are not safe and must cease support until the situation is resolved at 200900ZDEC19.
The government is scrutinized for not protecting aid workers.
Population posts to social media, blogs, and online news media chastising the government's inaction on 200905ZDEC19.
Insurgents will continue to attack and kill aid workers in order to send all their agencies home. They will try to use the same tactic with US forces and its allies in hopes to drive them out of the country.
Insurgents continue to periodically post images, video, and text regarding their attacks on aid workers and US forces for propaganda and intimidation until ENDEX.

Example Monitoring:

All trainee activity in the IE is monitored by TP 10 (e.g., via exercise controllers and O/CTs). Exercise controllers are able to see information flow across internet based and enabled platforms ensuring trainees remain inside their: approved authorities, TTPs, and mission;

or defined specialties and functional areas. O/CTs are notified by exercise controllers of trainee deviation from the previous for on the spot correction, or vice versus (e.g. O/CTs notifying exercise controllers).

Example Analysis:

Reporting on specific or exercise wide events enable a professional discussion, focused on performance standards, that enables trainees to discover for themselves: what happened; why it happened; and how to sustain strengths and improve on weaknesses. It is used to get maximum benefit from every mission or task.

Figure 6:
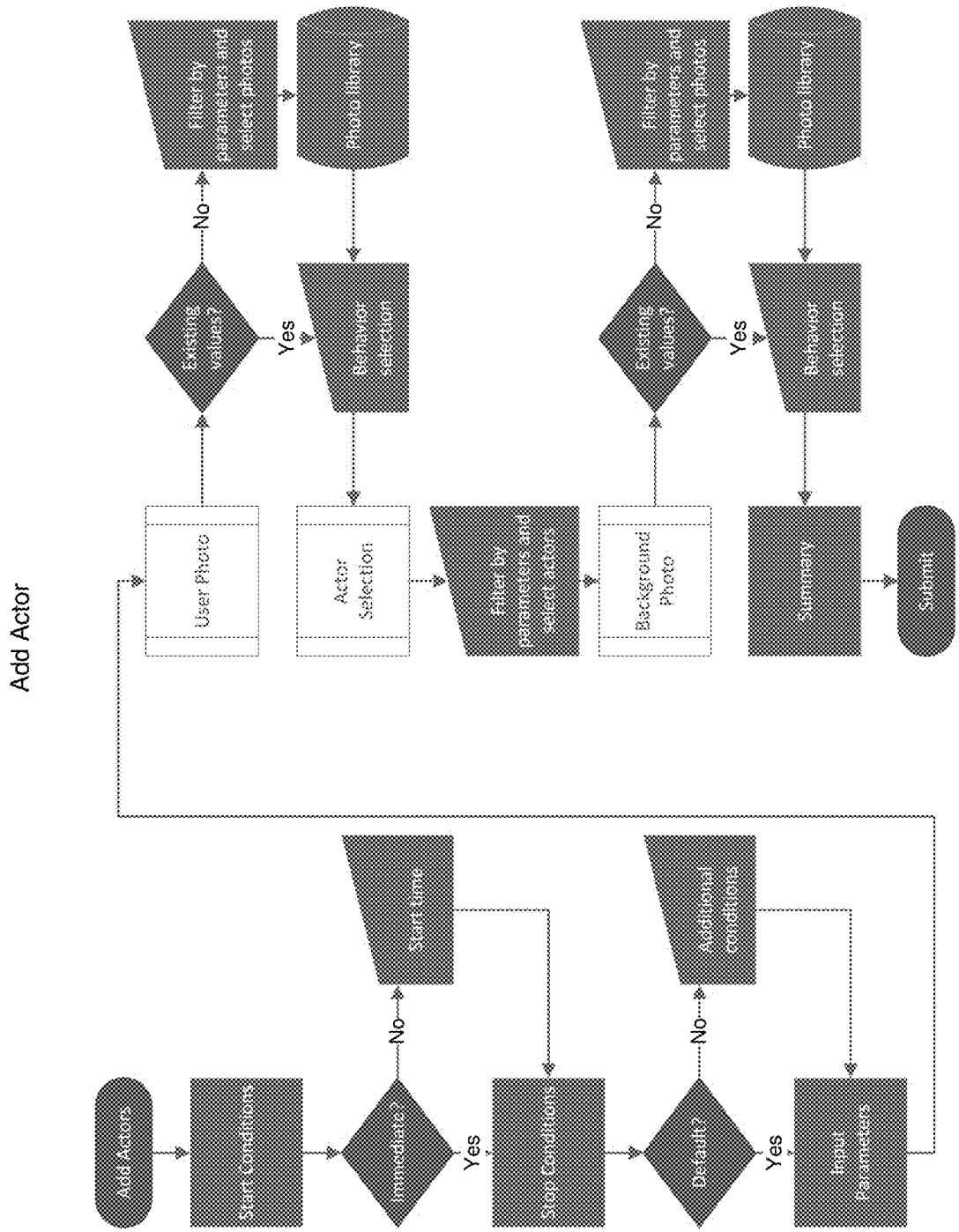
FIG. 6 is an example flowchart of a training process according to one or more example implementations of the disclosure.

Referring to the example implementation of FIG. 6, an example flowchart of a TP 10 process of adding an actor (e.g., via UI 400) is shown. In the example, when a user wants to add an actor(s) to an internet based platform, the user selects (e.g., via UI 400) which internet based platform is desired (e.g., social media, online news media, email, etc.). The user sets the "Start Conditions" variables desired, e.g.,: To begin the action as soon it is submitted (i.e. immediately); To begin the action on at a specified DTG (i.e. on 250900ZDEC19). The user sets the "Stop Conditions" variables desired, e.g.,: To stop the action at a specified DTG (i.e. on 260900ZDEC19); To stop after a specified amount of time has elapsed (e.g., after five second, after five minutes, after five days, etc.). To stop after a specified number of actors have been added (e.g., after 200 actors have been added). The user sets the "Input Parameters" variables desired, e.g.,: To select personas from the actor library to be added; To use existing persona default(s) avatar photos, associated demographic variables, etc., or select create new field variables. A preview may be generated once all variables, parameters, and options are selected. TP 10 may time stamps each actor and prepare to schedule the addition, respectively. The preview ensures selections are as the user intended to decrease the likelihood of user input error. The user submits the action and TP 10 performs or schedules the actor addition(s).

Figure 7:
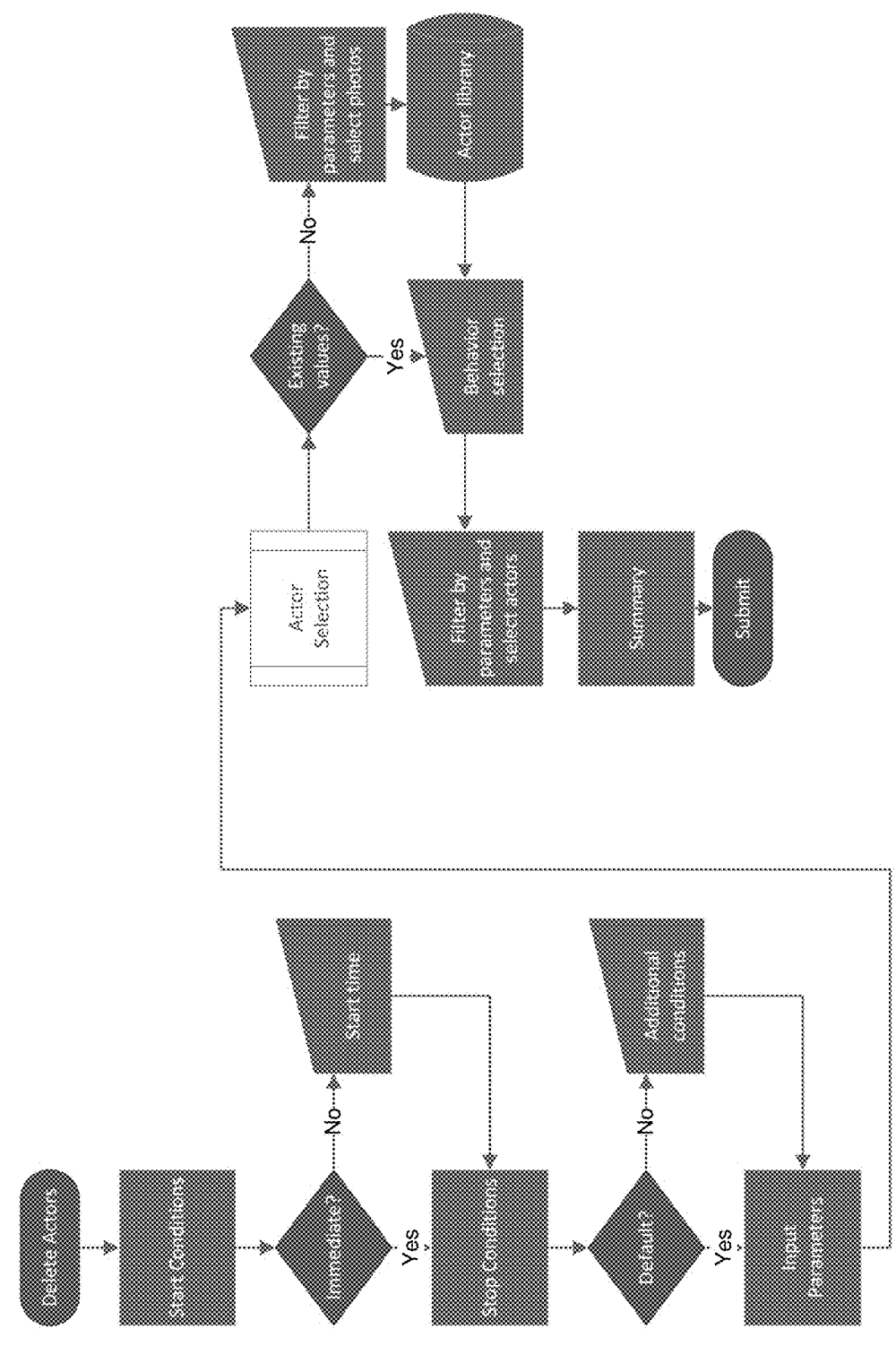
FIG. 7 is an example flowchart of a training process according to one or more example implementations of the disclosure.

Referring to the example implementation of FIG. 7, an example flowchart of a TP 10 process of deleting an actor (e.g., via UI 400) is shown. In the example, when a user wants to delete an actor(s) to an internet based platform, the user selects which internet based platform is desired (e.g., social media, online news media, email, etc.). The user sets the "Start Conditions" variables desired, e.g., to begin the action as soon it is submitted (e.g., immediately); to begin the action on at a specified DTG (e.g., on 250900ZDEC19). The user sets the "Stop Conditions" variables desired, e.g.,: to stop the action at a specified DTG (e.g., on 260900ZDEC19); to stop after a specified amount of time has elapsed (e.g., after five second, after five minutes, after five days, etc.). To stop after a specified number of actors have been deleted (e.g., after 200 actors have been deleted). The user sets the "Input Parameters" variables desired, e.g.,: to select persona(s) from the internet based platform to be deleted. A preview may be generated once all variables, parameters, and options are selected. TP 10 may time stamp each actor and prepares to schedule the deletion, respectively. The preview ensures selections are as the user intended to decrease the likelihood of user input error. The user submits the action and TP 10 performs or schedules the actor deletion(s).

Figure 8:
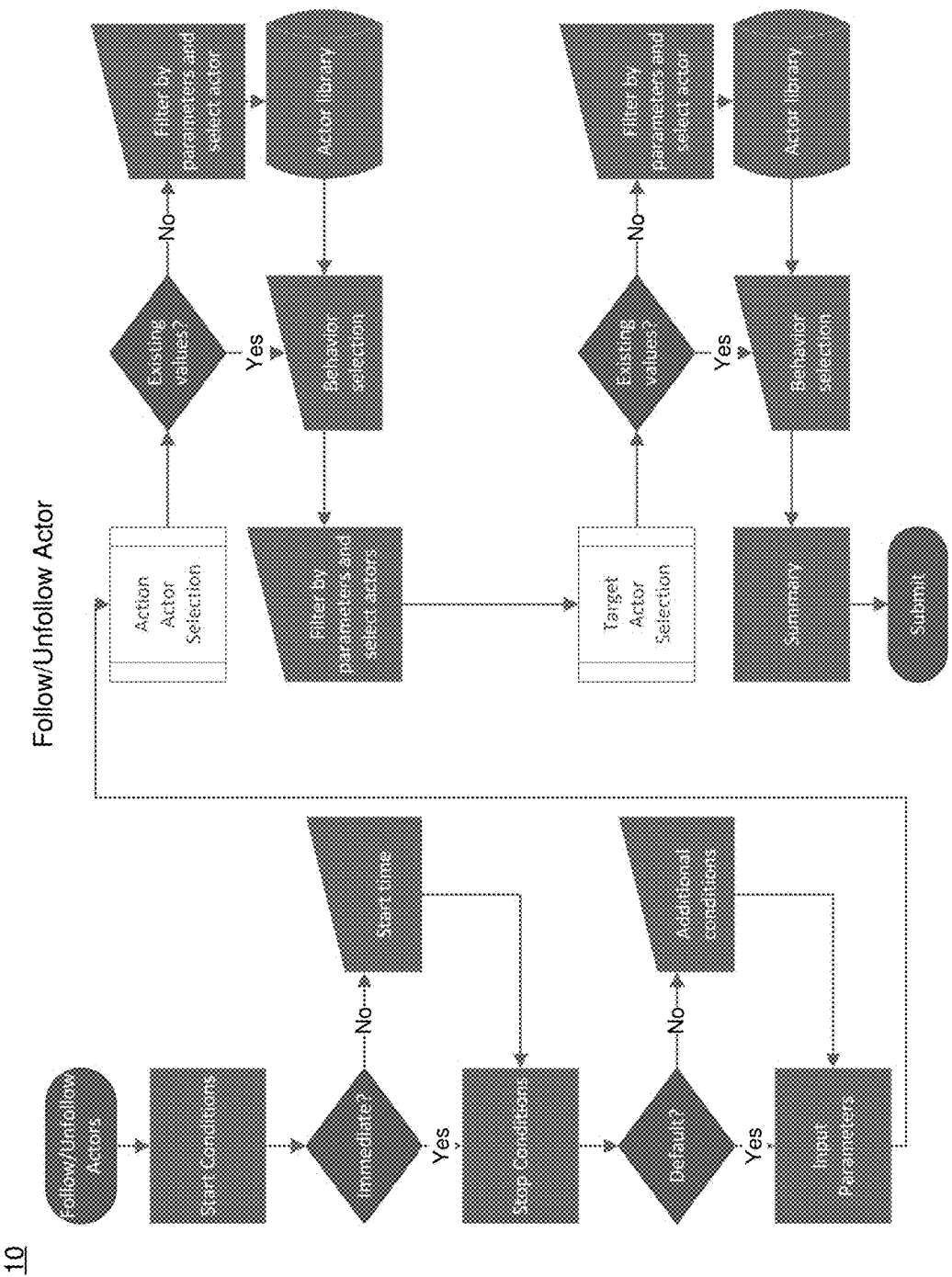
FIG. 8 is an example flowchart of a training process according to one or more example implementations of the disclosure.

Referring to the example implementation of FIG. 8, an example flowchart of a TP 10 process of following/unfollowing an actor (e.g., via UI 400) is shown. For example, when a user wants to follow/unfollow an actor(s) of an internet based platform, the user selects which internet based platform is desired (e.g., social media, online news media, email, etc.). The user sets the "Start Conditions" variables desired, e.g.,: to begin the action as soon it is submitted (e.g., immediately); to begin the action on at a specified DTG (e.g., on 250900ZDEC19). The user sets the "Stop Conditions" variables desired, e.g.,: to stop the action at a specified DTG (e.g., on 260900ZDEC19); to stop after a specified amount of time has elapsed (e.g., after five second, after five minutes, after five days, etc.); to stop after a specified number of actors have been followed/unfollowed (e.g., after 200 actors have been followed). The user sets the "Input Parameters" variables desired, e.g.,: to select personas from the internet based platform to perform the action; to select personas from the internet based platform to be followed/unfollowed. A preview is generated once all variables, parameters, and options are selected. TP 10 may time stamp each actor and prepares to schedule the action, respectively. The preview ensures selections are as the user intended to decrease the likelihood of user input error. The user submits the action and EDMT performs or schedules the action(s).

Figure 9:
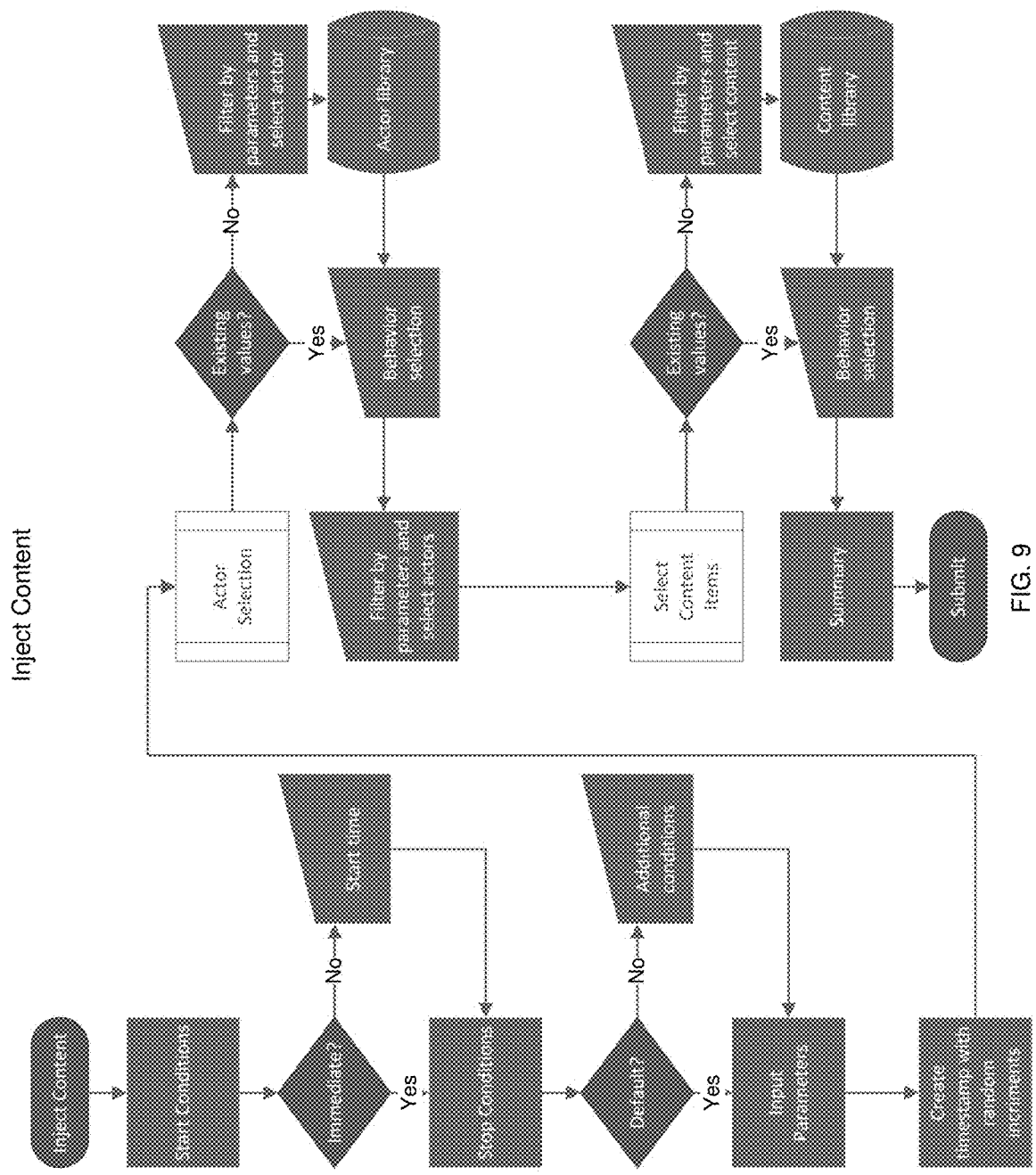
FIG. 9 is an example flowchart of a training process according to one or more example implementations of the disclosure.

Referring to the example implementation of FIG. 9, an example flowchart of a TP 10 process of injecting content (e.g., via UI 400) is shown. For example, when a user wants to inject content to an internet based platform: the user selects which internet based platform is desired (e.g., social media, online news media, email, etc.). The user sets the "Start Conditions" variables desired, e.g.,: to begin the action as soon it is submitted (e.g., immediately); to begin the action on at a specified DTG (e.g., on 250900ZDEC19). The user sets the "Stop Conditions" variables desired, e.g.,: to stop the action at a specified DTG (e.g., on 260900ZDEC19); to stop after a specified amount of time has elapsed (e.g., after five second, after five minutes, after five days, etc.); to stop after a specified number of injections have been performed (e.g., after 200 injections). The user sets the "Input Parameters" variables desired, e.g.,: to select the timestamp range that EDMT will randomly assign each injection (e.g., minimum of five seconds and maximum of two minutes between each timestamp); to select personas from the internet based platform to perform the action; to select content from the content library for the persona to inject. A preview is generated once all variables, parameters, and options are selected. TP 10 may time stamp each actor and prepares to schedule the action, respectively. The preview ensures selections are as the user intended to decrease the likelihood of user input error. The user submits the action and EDMT performs or schedules the action(s).

Figure 10:
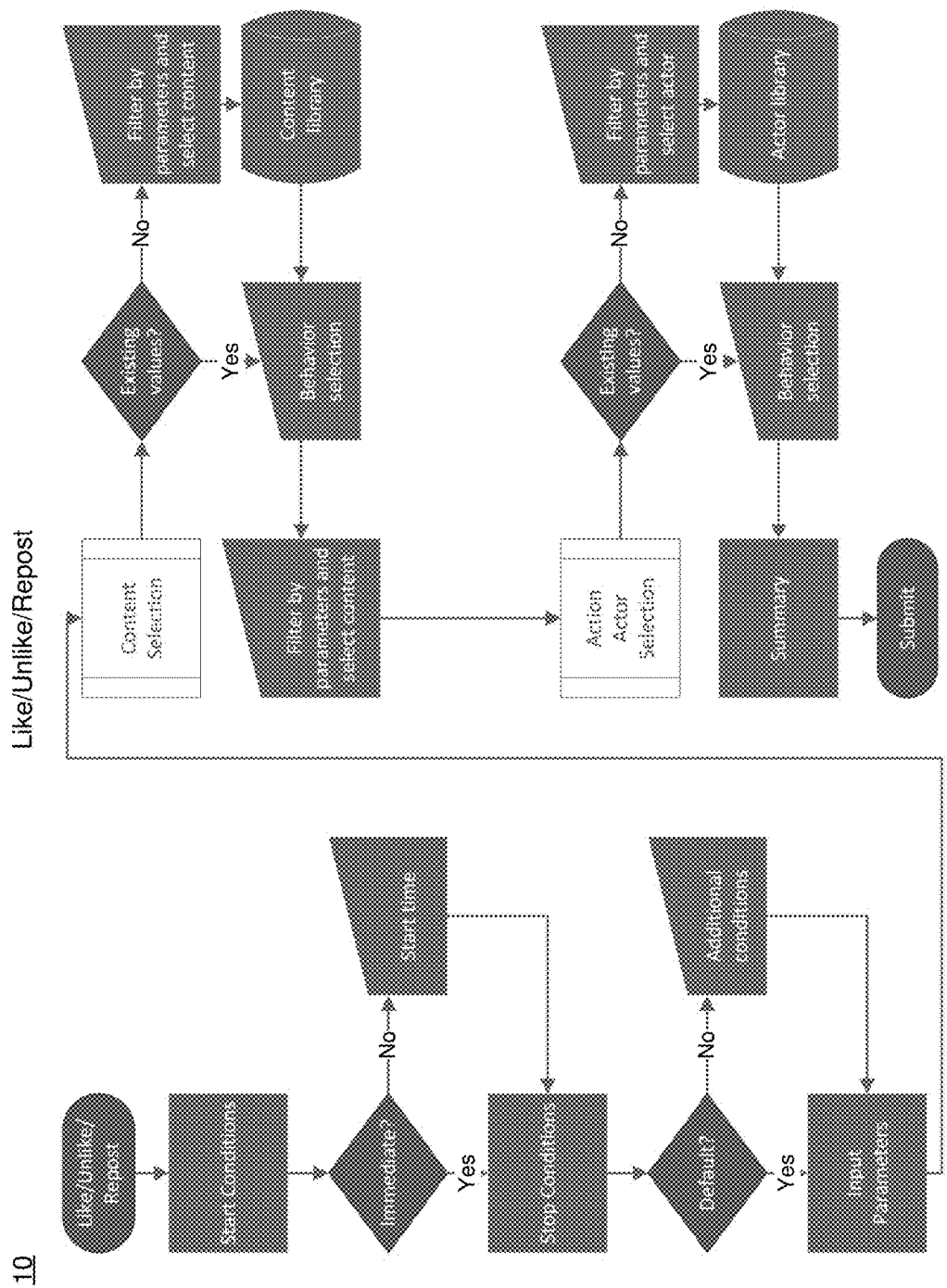
FIG. 10 is an example flowchart of a training process according to one or more example implementations of the disclosure.

Referring to the example implementation of FIG. 10, an example flowchart of a TP 10 process of liking/unliking/reposting content (e.g., via UI 400) is shown. For example, when a user wants to like/unlike/repost content to an internet based platform: the user selects which internet based platform is desired (e.g., social media, online news media, email, etc.). The user sets the "Start Conditions" variables desired, e.g.,: to begin the action as soon it is submitted (e.g., immediately); to begin the action on at a specified DTG (e.g., on 250900ZDEC19). The user sets the "Stop Conditions" variables desired, e.g.,: to stop the action at a specified DTG (e.g., on 260900ZDEC19); to stop after a specified amount of time has elapsed (e.g., after five second, after five minutes, after five days, etc.); to stop after a specified number of likes/unlikes/reposts have been performed (e.g., after 200 like/unlikes/reposts have been performed). The user sets the "Input Parameters" variables desired, e.g.,: to select the content from the internet based platform that the selected persona will like/unlike/repost; to select personas from the internet based platform to perform the action. A preview is generated once all variables, parameters, and options are selected. TP 10 may time stamp each actor and prepares to schedule the action, respectively. The preview ensures selections are as the user intended to decrease the likelihood of user input error. The user submits the action and EDMT performs or schedules the action(s).

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   receiving, by a computing device, a design scenario for execution on one or more internet based platforms;
   injecting seed data into the one or more internet based platforms during execution based upon, at least in part, the design scenario, wherein at least a portion of the seed data that is injected is dynamically created by monitoring content of the one or more internet based platforms;
   monitoring sentiment of a topic of interest in response to injecting the seed data into the one or more internet based platforms during execution;
   shifting the sentiment of a topic of interest associated with the design scenario based upon, at least in part, at least the portion of the seed data that is dynamically created and injected into the one or more internet based platforms during execution;
   monitoring performance of the scenario; and
   generating a report based upon, at least in part, the performance.

2. The computer-implemented method of claim 1 wherein the seed data is injected at a predetermined data and time.

3. The computer-implemented method of claim 1 wherein the design scenario is selected from a user interface.

4. The computer-implemented method of claim 1 wherein the performance is monitored for one of a trainee and software.

5. The computer-implemented method of claim 1 wherein the one or more internet based platforms includes at least one of a social media platform, an internet relay chat, email, a blog, a deep web website, and a dark web website.

6. The computer-implemented method of claim 1 wherein the design scenario is executed with internet access.

7. The computer-implemented method of claim 1 wherein the design scenario is executed without internet access.

8. A computer program product residing on a non-transitory computer readable storage medium having a plurality of instructions stored thereon which, when executed across one or more processors, causes at least a portion of the one or more processors to perform operations comprising:
   receiving a design scenario for execution on one or more internet based platforms;
   injecting seed data into the one or more internet based platforms during execution based upon, at least in part, the design scenario, wherein at least a portion of the seed data that is injected is dynamically created using a machine learning engine by monitoring content of the one or more internet based platforms;
   monitoring sentiment of a topic of interest in response to injecting the seed data into the one or more internet based platforms during execution;
   shifting the sentiment of a topic of interest associated with the design scenario based upon, at least in part, at least the portion of the seed data that is dynamically created and injected into the one or more internet based platforms during execution;
   monitoring performance of the scenario; and
   generating a report based upon, at least in part, the performance.

9. The computer program product of claim 8 wherein the seed data is injected at a predetermined data and time.

10. The computer program product of claim 8 wherein the design scenario is selected from a user interface.

11. The computer program product of claim 8 wherein the performance is monitored for one of a trainee and software.

12. The computer program product of claim 8 wherein the one or more internet based platforms includes at least one of a social media platform, an internet relay chat, email, a blog, a deep web website, and a dark web website.

13. The computer program product of claim 8 wherein the design scenario is executed with internet access.

14. The computer program product of claim 8 wherein the design scenario is executed without internet access.

15. A computing system including one or more processors and one or more memories configured to perform operations comprising:
   receiving a design scenario for execution on a plurality of internet based platforms;
   injecting seed data into the plurality of internet based platforms during execution using a service and message broker with a plurality of internet based platform application programming interfaces (APIs) associated with the plurality of internet based platforms based upon, at least in part, the design scenario, wherein at least a portion of the seed data that is injected is dynamically created by monitoring content of the plurality of internet based platforms;

monitoring sentiment of a topic of interest in response to injecting the seed data into the plurality of internet based platforms during execution:

shifting the sentiment of a topic of interest associated with the design scenario based upon, at least in part, at least the portion of the seed data that is dynamically created and injected into the one or more internet based platforms during execution;

monitoring performance of the scenario; and generating a report based upon, at least in part, the performance.

16. The computing system of claim 15 wherein the seed data is injected at a predetermined data and time.

17. The computing system of claim 15 wherein the design scenario is selected from a user interface.

18. The computing system of claim 15 wherein the performance is monitored for one of a trainee and software.

19. The computing system of claim 15 wherein the one or more internet based platforms includes at least one of a social media platform, an internet relay chat, email, a blog, a deep web website, and a dark web website.

20. The computing system of claim 15 wherein the design scenario is executed with internet access.

21. The computing system of claim 15 wherein the design scenario is executed without internet access.

* * * * *